United States Patent
Kitazawa

(10) Patent No.: US 12,105,221 B2
(45) Date of Patent: Oct. 1, 2024

(54) REFLECTOR WITH ACTUATOR, OPTICAL SCANNER, AND MIRROR ACTUATOR

(71) Applicant: PIONEER CORPORATION, Tokyo (JP)

(72) Inventor: Shogo Kitazawa, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 1058 days.

(21) Appl. No.: 16/979,505

(22) PCT Filed: Mar. 6, 2019

(86) PCT No.: PCT/JP2019/008843
§ 371 (c)(1),
(2) Date: Sep. 9, 2020

(87) PCT Pub. No.: WO2019/172307
PCT Pub. Date: Sep. 12, 2019

(65) Prior Publication Data
US 2021/0018601 A1    Jan. 21, 2021

(30) Foreign Application Priority Data

Mar. 9, 2018 (JP) .................... 2018-042733

(51) Int. Cl.
*G01S 7/48*    (2006.01)
*G01S 7/481*    (2006.01)
(Continued)

(52) U.S. Cl.
CPC ........ *G01S 7/4817* (2013.01); *G02B 26/0816* (2013.01); *G02B 26/101* (2013.01)

(58) Field of Classification Search
USPC ....................................................... 356/4.01
See application file for complete search history.

(56) References Cited

U.S. PATENT DOCUMENTS 7,408,690 B1 * 8/2008 Mizoguchi ........... G02B 26/085
359/224.1
8,437,063 B2 * 5/2013 Weiss ................... G02B 26/085
359/224.1
(Continued)

FOREIGN PATENT DOCUMENTS

JP    S54136345 A    10/1979
JP    2000275340 A    10/2000
(Continued)

OTHER PUBLICATIONS

Long, Yongjun, et al. "Modeling and analysis of a novel two-axis rotary electromagnetic actuator for fast steering mirror." Journal of Magnetics 19.2 (2014): 130-139. (Year: 2014).*
(Continued)

*Primary Examiner* — James R Hulka
(74) *Attorney, Agent, or Firm* — PROCOPIO, CORY, HARGREAVES & SAVITCH LLP

(57) ABSTRACT

An optical scanner having high utilization efficiency of light is provided. A reflector with actuator includes a reflector having reflection regions formed on both surfaces thereof, first supporting parts supporting the reflector from both sides in a plane direction and defining a first rotary axis of the reflector, a first magnetic element installed on one surface of the reflector at a position displaced from the first rotary axis, and a first magnetic actuator configured to move the first magnetic element in a direction that rotates the reflector around the first rotary axis.

11 Claims, 6 Drawing Sheets

(51) Int. Cl.
*G02B 26/08* (2006.01)
*G02B 26/10* (2006.01)

(56) References Cited

U.S. PATENT DOCUMENTS

| | | | | |
|---|---|---|---|---|
| 8,570,633 | B2* | 10/2013 | Jeong | G02B 26/085 |
| | | | | 359/224.1 |
| 8,705,016 | B2* | 4/2014 | Schumann | G02B 26/10 |
| | | | | 356/3.01 |
| 9,122,059 | B2* | 9/2015 | Honda | G02B 7/1821 |
| 11,067,792 | B2* | 7/2021 | Katsuyama | H01F 10/08 |
| 2008/0068688 | A1 | 3/2008 | Mizoguchi | |
| 2009/0039715 | A1 | 2/2009 | Noguchi et al. | |
| 2010/0046054 | A1 | 2/2010 | Jeong et al. | |
| 2011/0286066 | A1* | 11/2011 | Weiss | H04N 3/08 |
| | | | | 359/201.1 |
| 2013/0229698 | A1* | 9/2013 | Honda | G02B 26/10 |
| | | | | 359/199.3 |
| 2019/0010798 | A1* | 1/2019 | Tchakarov | G01V 3/26 |
| 2019/0101746 | A1* | 4/2019 | Katsuyama | G02B 26/085 |
| 2020/0041781 | A1* | 2/2020 | Schitter | H01F 7/14 |

FOREIGN PATENT DOCUMENTS

| | | |
|---|---|---|
| JP | 2002323669 A | 11/2002 |
| JP | 2005169553 A | 6/2005 |
| JP | 2009042322 A | 2/2009 |
| JP | 2010-049259 A | 3/2010 |
| JP | 2010217782 A | 3/2010 |
| JP | 2014240895 A | 12/2014 |

OTHER PUBLICATIONS

Japanese Patent Office, Notice of Reasons for Refusal, Application No. JP 2020-505075, dated Sep. 15, 2021, in 10 pages.
European Patent Office, Extended European Search Report, Application No. PCT/JP2019/008843, dated Oct. 18, 2021.
Japanese Patent Office, Notice of Reasons for Refusal, Application No. 2020-505075, dated Apr. 19, 2022, in 10 pages.
International Search Report and Written Opinion for related JP App. No. PCT/JP2019/008843 dated May 28, 2019. English translation provided; 9 pages.

* cited by examiner

REFLECTOR WITH ACTUATOR, OPTICAL SCANNER, AND MIRROR ACTUATOR

CROSS-REFERENCE TO RELATED APPLICATIONS

This application is a U.S. National Stage entry of PCT Application No. PCT/JP2019/008843, filed on Mar. 6, 2019, which claims priority to JP Application No. 2018-042733, filed Mar. 9, 2018. The contents of the foregoing are incorporated by reference.

TECHNICAL FIELD

This invention relates to a reflector with actuator used for scanning with emitted light, an optical scanner including the reflector with actuator, and a mirror actuator.

BACKGROUND ART

There is conventionally known an optical scanner which scans a scanning target region with emitted light from a light source and measures a distance or the like to an object existing in the scanning target region based on a time taken to detect return light from the scanning target region by an optical detector (for example, refer to Patent Document 1). In the optical scanner described in Patent Document 1, emitted light from the light source is passed through a beam splitter and reflected by a reflector with actuator and emitted to a scanning target region. The reflector with actuator changes a reflecting direction of the emitted light from the light source by rotating a reflector with an actuator and performs a scan. Return light from the scanning target region returns through substantially the same optical path as the emitted light from being reflected by the reflector with actuator to reaching the beam splitter. Then, a portion of the return light is separated from the optical path by the beam splitter and directed to an optical detector.

In the above-mentioned optical scanner, the return light returns through substantially the same optical path as the emitted light, and this is because both of the emitted light from the light source and the return light from the scanning target region are reflected by the same surface of the reflector. Therefore, after the return light is reflected by the reflector with actuator, the beam splitter is necessary in order to separate the return light from the optical path and direct the return light to the optical detector.

CITATION LIST

Patent Document

[Patent Document 1] Japanese Unexamined Patent Application Publication No. 2000-275340

SUMMARY OF THE INVENTION

Technical Problem

However, in the above-mentioned optical scanner, as a result of arranging the beam splitter, utilization efficiency of light tends to be low since there is loss in amount of light in at least one of the emitted light and the return light.

Therefore, an example of the problems to be solved by the present invention is to provide a reflector with actuator capable of constituting an optical scanner having high utilization efficiency of light, an optical scanner including the reflector with actuator, and a mirror actuator.

Solution to Problem

In order to solve the problem and to achieve the object aforementioned, a reflector with actuator of the present invention described in claim 1 includes: a reflector having reflection regions formed on both surfaces thereof; a first supporting part supporting the reflector and defining a first rotary axis of the reflector; a first magnetic element installed on the reflector at a position displaced from the first rotary axis; and a first magnetic actuator acting on the first magnetic element to move the first magnetic element in a direction that rotates the reflector around the first rotary axis.

DESCRIPTION OF EMBODIMENTS

Figure 1:
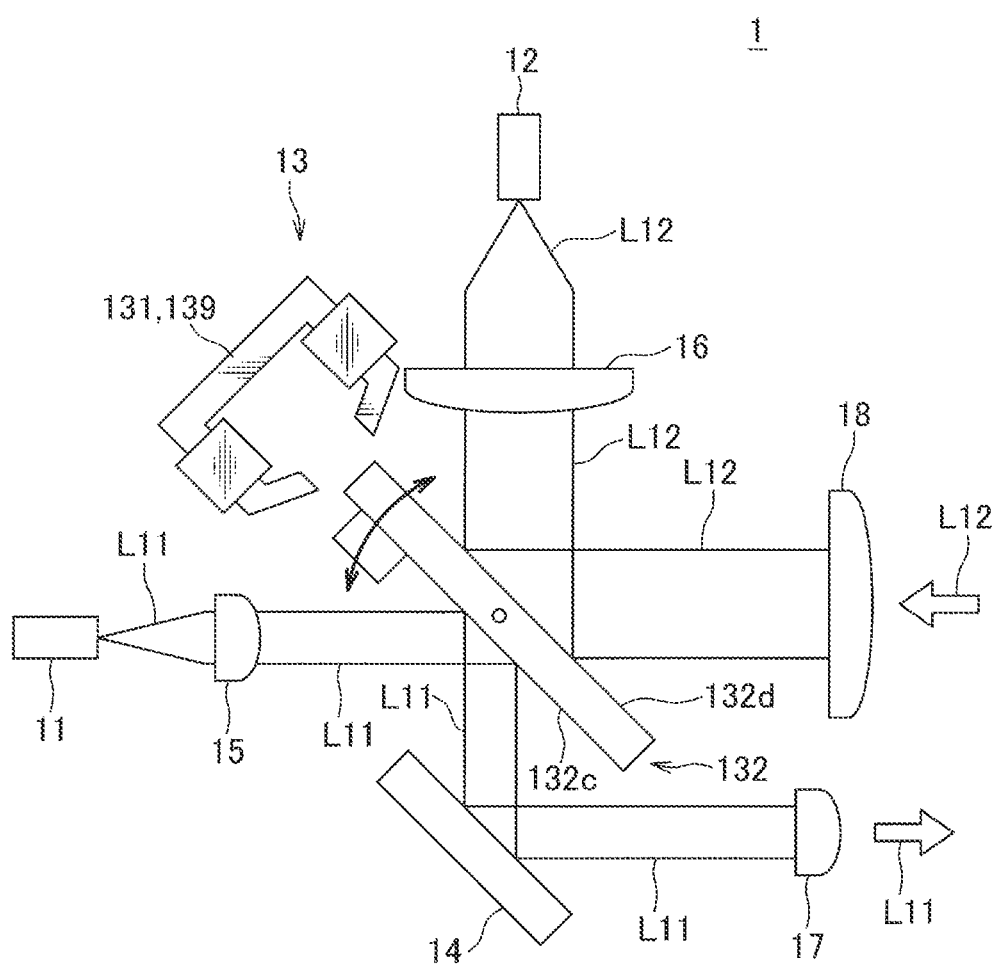
FIG. 1 is a schematic diagram illustrating an optical scanner according to a first example of the present invention.

An embodiment of the present invention will be described below. A reflector with actuator according to the embodiment of the present invention includes a reflector, a first supporting part, a first magnetic element, and a first magnetic actuator. The reflector has reflection regions formed on both surfaces thereof. The first supporting part supports the reflector and defines a first rotary axis of the reflector. The first magnetic element is installed on the reflector at a position displaced from the first rotary axis. The first magnetic actuator acts on the first magnetic element to move the first magnetic element in a direction that rotates the reflector around the first rotary axis.

In the reflector with actuator of the present embodiment, the first magnetic element that is moved by the first magnetic actuator is installed on the reflector at a position displaced from the first rotary axis. Thus, light can be reflected by the reflection regions on both surfaces of the reflector without being interrupted by the first magnetic element or the first magnetic actuator. That is, the reflector with actuator of the present embodiment can be used as a double-sided reflector. Consequently, when constituting an optical scanner with the reflector with actuator of the present embodiment, it is possible to configure to reflect emitted light on a first surface out of the both surfaces of the reflector and to reflect return light on a second surface out of the both surfaces. Therefore, it is not necessary to separate a portion of the return light from an optical path of the emitted light by using a beam splitter and direct the return light to an optical detector. That is, according to the reflector with actuator of the present embodiment, it is possible to constitute an optical scanner having high utilization efficiency of light by not using a beam splitter.

In the reflector with actuator of the present embodiment, the first magnetic element is installed on at least one surface of the reflector.

Thus, a movement of the first magnetic element is directly transmitted to the reflector, thereby efficiently rotating the reflector.

Further, in the reflector with actuator of the present embodiment, the first rotary axis divides the reflection region into two regions having different lengths in a direction orthogonal to the first rotary axis, and the first magnetic element is installed in a region having the length that is shorter.

Consequently, with respect to the region out of the two regions having the length that is longer, it is possible to obtain a large rotation amount around the first rotary axis with respect to a driving amount of the first magnetic element. When constituting the optical scanner, since the emitted light and the return light are reflected by this region having the length that is longer while avoiding the first magnetic element, it is possible to obtain a large scanning amount with respect to the driving amount of the first magnetic element.

Further, the reflector with actuator of the present embodiment may include a second supporting part, a second magnetic element, and a second magnetic actuator. The second supporting part supports the reflector so as to define a second rotary axis which is orthogonal to the first rotary axis. The second magnetic element is installed at a position at which the second magnetic element moves, when applied with a magnetic force, in a direction that rotates the reflector around the second rotary axis. The second magnetic actuator applies the magnetic force with respect to the second magnetic element.

Thus, it is possible to rotate the reflector around two axes, namely, the first rotary axis and the second rotary axis. That is, it is possible to constitute an optical scanner capable of two-dimensionally scanning a scanning target region. Further, since the rotation of the reflector around each rotary axis is performed by the magnetic element and the magnetic actuator corresponding to each rotary axis, the rotation of the reflector around each rotary axis can be easily performed.

Further, the reflector with actuator of the present embodiment may include the second supporting part, and the first magnetic element thereof may be an element described below, and the first magnetic actuator thereof may include a pair of actuator portions described below. First, the second supporting part supports the reflector so as to define the second rotary axis which is orthogonal to the first rotary axis. Then, the first magnetic element is an element which extends in an axis direction of the first rotary axis so as to intersect the second rotary axis. Further, the first magnetic actuator includes the pair of actuator portions which applies magnetic forces to two portions of the first magnetic element that are arranged so as to sandwich the second rotary axis.

By such a configuration also, it is possible to rotate the reflector around the two axes, namely, the first rotary axis and the second rotary axis, thus it is possible to constitute the optical scanner capable of two-dimensionally scanning the scanning target region. Further, since the reflector can be rotated about the two axes using only the combination of the first magnetic element and the first magnetic actuator, it is possible to downsize the reflector with actuator.

Further, in the reflector with actuator having a configuration like this, it is preferable that the pair of actuator portions moves the first magnetic element in a direction that rotates the reflector around the second rotary axis by applying magnetic forces that are different from each other in at least one of magnitude and polarity.

According to this, by controlling the magnitude and the polarity of the magnetic forces applied by the respective ones of the pair of actuator portions while balancing them between each other, it is possible to control rotation of the reflector around the first rotary axis. In addition, by controlling the magnitude and the polarity of the magnetic forces applied by the respective ones of the pair of actuator portions while making them different from each other, it is possible to control rotation of the reflector around the second rotary axis.

Further, an optical scanner according to the embodiment of the present invention includes a light source, an optical detector, and the above-mentioned reflector with actuator. The optical scanner is configured such that emitted light from the light source is reflected by the first surface out of the both surfaces of the reflector of the reflector with actuator so as to be guided to a scanning target region, and return light from the scanning target region is reflected by the second surface out of the both surfaces so as to be guided to the optical detector.

According to the optical scanner of the present embodiment, since the emitted light and the return light can be separated by the reflector with actuator, the beam splitter is not necessary. Thus, according to the optical scanner of the present embodiment, there is no loss in amount of light due to the beam splitter, and thus it is possible to obtain high utilization efficiency of light.

Further, a mirror actuator according to the embodiment of the present invention is constituted with a swing part, a first supporting part, a magnet, and a yoke. In the swing part, a first surface and a second surface arranged on an opposite side of the first surface are reflection surfaces. The first supporting part supports the swing part so as to allow the swinging part to swing around a first swing axis. The magnet is provided in a region of the swing part where no reflection surface is formed. The yoke generates a magnetic field which acts on the magnet.

According to the mirror actuator of the present embodiment, it is possible to constitute the optical scanner having high utilization efficiency of light.

Further, in the mirror actuator of the present embodiment, the magnet is provided on at least one of the first surface and the second surface of the swing part.

Thus, the movement of the first magnetic element is directly transmitted to the swing part, thereby allowing the swing part to swing efficiently.

EXAMPLES

An example of the present invention will be described in detail with reference to the drawings. First, a first example is described.

FIG. 1 is a schematic diagram illustrating an optical scanner according to the first example of the present invention.

An optical scanner 1 shown in FIG. 1 includes a light source 11, an optical detector 12, a reflector with actuator 13, a reflection mirror for emitted light 14, a lens for light source 15, a lens for detector 16, a lens for emitted light 17, and a lens for return light 18. The optical scanner 1 is a device which scans a scanning target region with emitted light L11 from the light source 11 and measures a distance or the like to an object existing in the scanning target region based on a time taken to detect return light L12 from the scanning target region by the optical detector 12.

In this optical scanner 1, the emitted light L11 from the light source 11 passes through the lens for light source 15, is reflected by the reflector with actuator 13 and the reflection mirror for emitted light 14, passes through the lens for emitted light 17, and is emitted to the scanning target region. The reflector with actuator 13 changes a reflecting direction of the emitted light L11 from the light source 11 by rotating a reflector 132 by a first magnetic actuator 131 and a second magnetic actuator 139, details of which are described later, and performs a scan.

Here, the reflector 132 in the reflector with actuator 13 is a double-sided reflector having a reflection region formed on both surfaces thereof. The emitted light L11 from the light source 11 is reflected by a first surface 132c out of the both surfaces of the reflector 132 so as to be guided to the scanning target region.

The return light L12 from the scanning target region is passed through the lens for return light 18, reflected by a second surface 132d of the reflector with actuator 13, passed through the lens for detector 16 and directed to the optical detector 12.

In the reflector with actuator 13, the return light L12 from the scanning target region is reflected by the second surface 132d out of the both surfaces of the reflector 132 so as to be guided to the optical detector 12.

Then, in a not-shown control device, a distance or the like to the object is calculated based on a time from when the emitted light L11 is emitted from the light source 11 to when the return light L12 which is the emitted light L11 reflected by the object existing in the scanning target region is detected by the optical detector 12.

Figure 2:
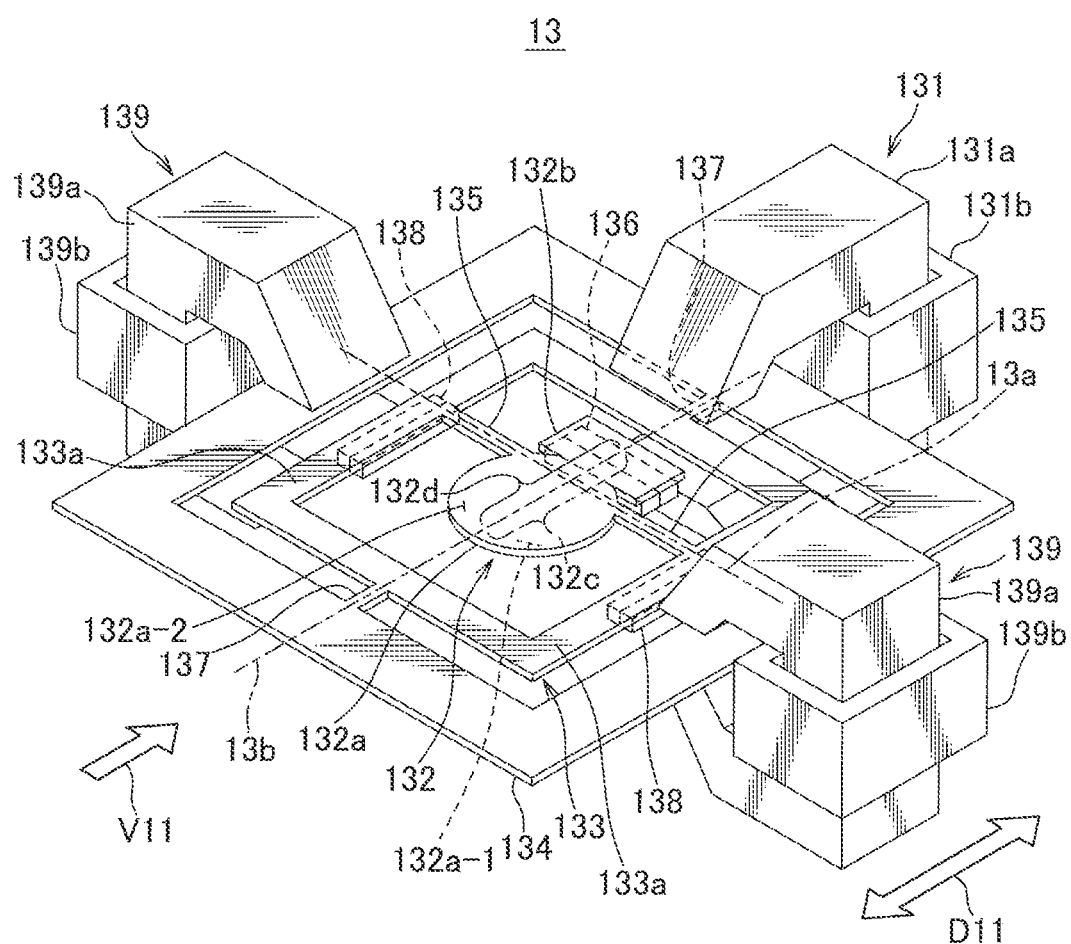
FIG. 2 is a perspective view illustrating a reflector with actuator schematically shown in FIG. 1.

FIG. 2 is a perspective view illustrating the reflector with actuator schematically shown in FIG. 1.

The reflector with actuator 13 (mirror actuator) includes the first magnetic actuator 131, the reflector 132 (swing part), an inner frame 133, an outer frame 134, a first supporting part 135, and a first magnetic element 136. In addition, the reflector with actuator 13 includes a second supporting part 137, a second magnetic element 138, and a second magnetic actuator 139.

First, the reflector 132, the inner frame 133, the outer frame 134, the first supporting part 135, and the second supporting part 137 are integrally formed by a silicon material. The reflector 132 includes a circular plate portion 132a and a rectangular plate portion 132b, and reflection regions 132a-1 and 132a-2 are formed on both surfaces of the circular plate portion 132a by vapor deposition or the like of gold or aluminum or the like.

On the first surface 132c out of both surfaces 132c and 132d of the reflector 132 shown also in FIG. 1, the emitted light L11 is reflected by the reflection region 132a-1 formed on the circular plate portion 132a. Further, on the second surface 132d, the return light L12 is reflected by the reflection region 132a-2 formed on the circular plate portion 132a.

The inner frame 133 is a quadrangular frame formed surrounding the reflector 132, and the outer frame 134 is a quadrangular frame formed surrounding the inner frame 133.

The first supporting units 135 support the reflector 132 from the both sides, and are provided to define a first rotary axis 13a of the reflector 132. The reflector 132 is connected to the inner frame 133 by the pair of first supporting parts 135, and the pair of first supporting parts 135 is a pair of torsion bars which twists around the first rotary axis 13a.

The second supporting parts 137 support the reflector 132 from the both sides so as to define a second rotary axis 13b which is orthogonal to the first rotary axis 13a. The above-mentioned inner frame 133 is connected to the outer frame 134 by the pair of second supporting parts 137, and the pair of the second supporting parts 137 is a pair of torsion bars which twists around the second rotary axis 13b. The second supporting parts 137 support, via the inner frame 133, the reflector 132 connected to the inner frame 133.

The first magnetic element 136 is a permanent magnet installed on one surface of the reflector 132 at a position displaced from the first rotary axis 13a. Specifically, the first magnetic element 136 is installed on the first surface 132c side of the rectangular plate portion 132b shown also in FIG. 1. The first magnetic element 136 is a permanent magnet having a rectangular parallelepiped shape that is magnetized such that a N-pole portion and a S-pole portion are arranged in an axis direction of the second rotary axis 13b.

The first magnetic element 136 is installed on the rectangular plate portion 132b such that a lengthwise direction thereof is parallel to the first rotary axis 13a. To enable such installation, the rectangular plate portion 132b is formed into a rectangular shape in which a long side thereof extends in parallel to the first rotary axis 13a.

In this example, the first rotary axis 13a divides both of the reflection regions 132a-1 and 132a-2 into two regions with different lengths in an orthogonal direction D11 with respect to the first rotary axis 13a. Then, the first magnetic element 136 is installed to the region with shorter length in the orthogonal direction D11. That is, the above-mentioned rectangular plate portion 132b is provided on a side of this region with shorter length, and the first magnetic element 136 is installed on the rectangular plate portion 132b.

The first magnetic actuator 131 is an electromagnet provided one at a position at which it applies a magnetic force to the first magnetic element 136, and includes a yoke 131a and a coil 131b. This first magnetic actuator 131 applies a magnetic force to the first magnetic element 136, and rotates the reflector 132 around the first rotary axis 13a.

The second magnetic elements 138 are both permanent magnets having a rectangular parallelepiped shape similar to the first magnetic element 136, and are installed on an extended plane of the above-mentioned first surface 132c of the reflector 132 so as to rotate the reflector 132 around the second rotary axis 13b when applied with a magnetic force. Specifically, the second magnetic elements 138 are installed one on each of surfaces of a pair of opposing side portions 133a of the rectangular inner frame 133 on the side same as the side on which the first magnetic element 136 is installed, the pair of opposing side portions 133a extending parallel to the second rotary axis 13b. The second magnetic element 138 is installed on each side portion 133a so that the lengthwise direction thereof is arranged along the lengthwise direction of each side portion 133a, i.e., is arranged parallel to the second rotary axis 13b.

The second magnetic actuators 139 are electromagnets which are the same as the above-mentioned first magnetic actuator 131 and are provided one at a position at which it applies a magnetic force to each of the pair of second magnetic elements 138. Each of the second magnetic actuators 139 includes a yoke 139a and a coil 139b.

Figure 3:
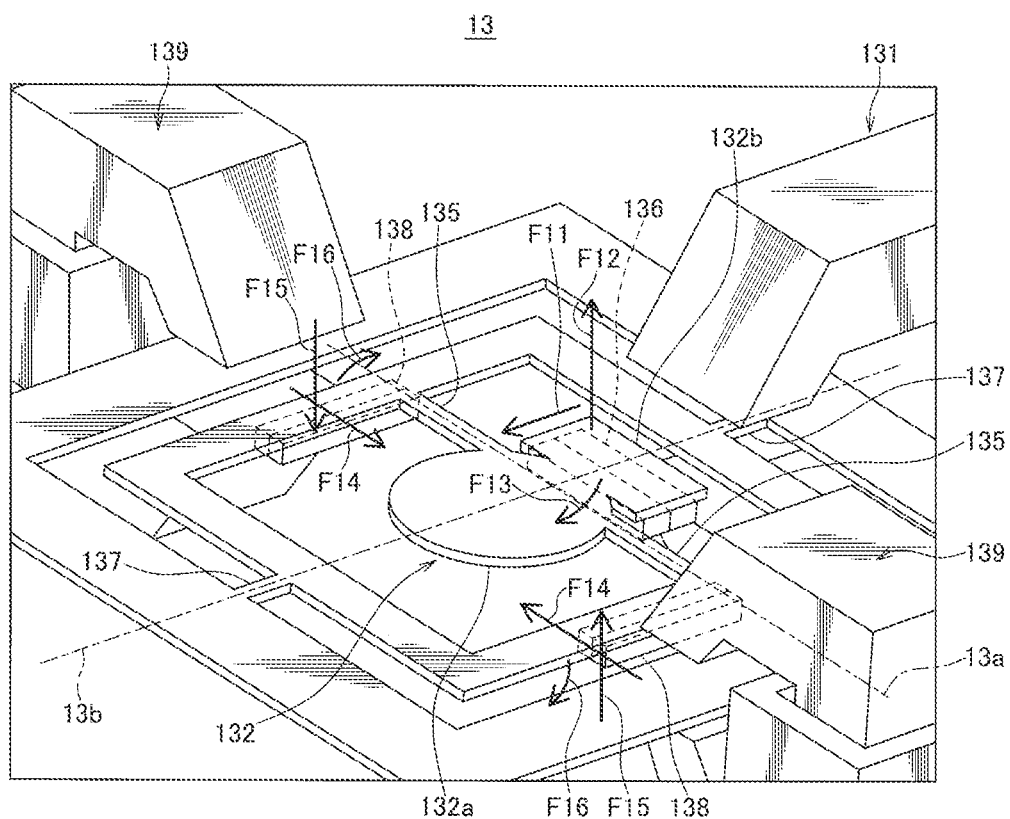
FIG. 3 is an enlarged perspective view of a main portion around the reflector illustrating how the reflector is rotationally driven by a first magnetic actuator and a second magnetic actuator shown in FIG. 2.
Figure 4:
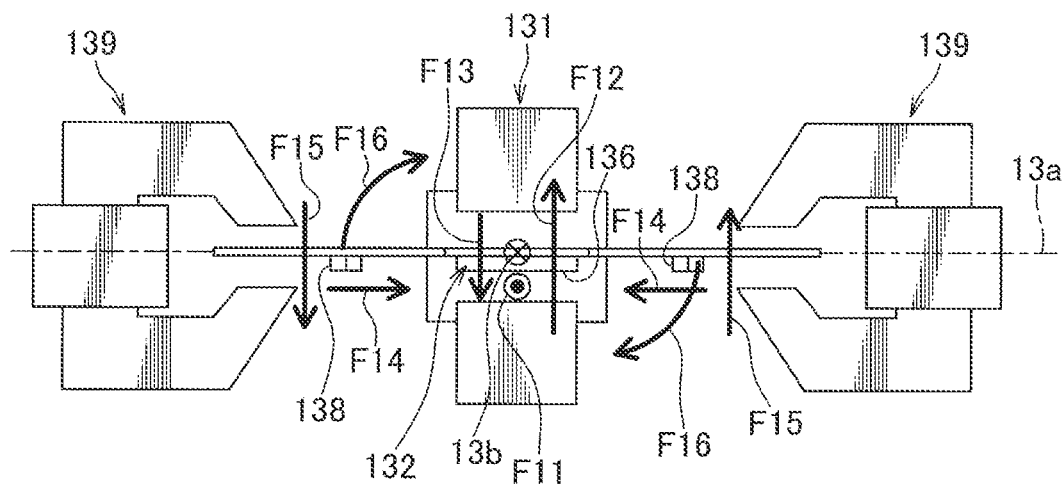
FIG. 4 is a side view viewed from an arrow V11 direction in FIG. 2 illustrating how the reflector is rotationally driven by the first magnetic actuator and the second magnetic actuator shown in FIG. 2.

FIG. 3 is an enlarged perspective view of a main portion around the reflector illustrating how a reflector is rotationally driven by the first magnetic actuator and the second magnetic actuator shown in FIG. 2. Further, FIG. 4 is a side view viewed from an arrow V11 direction in FIG. 2 illustrating how the reflector is rotationally driven by the first magnetic actuator and the second magnetic actuator shown in FIG. 2.

First, rotary drive by the first magnetic actuator 131 is described.

The first magnetic element 136 is a permanent magnet and generates a magnetic field F11. Suppose that the first magnetic actuator 131 generates a magnetic field F12 with respect to the first magnetic element 136. In this case, a driving force F13 with respect to the reflector 132 is generated due to repulsion and attraction between these two magnetic fields F11 and F12. This driving force F13 makes the reflector 132 rotated around the first rotary axis 13a defined by the first supporting part 135. A rotation amount at this time is adjusted by controlling magnitude of the magnetic force generated by the first magnetic actuator 131 by a not-shown control unit. Further, a rotation direction is controlled according to a direction of the magnetic field F12 generated by the first magnetic actuator 131.

Next, rotary drive by the pair of second magnetic actuators 139 is described.

The pair of second magnetic elements 138 are also permanent magnets similar to the first magnetic element 136 and generate a magnetic field F14. At this time, the pair of second magnetic elements 138 are arranged so that the poles with the same polarity face each other. At this time, when the pair of the second magnetic actuators 139 generate the magnetic fields F15 having the opposite directions, driving forces F16 are generated with respect to the respective second magnetic elements 138. At this time, since the respective second magnetic actuators 139 are generating the magnetic fields F15 in the opposite directions, the driving forces F16 generated with respect to the respective second magnetic elements 138 are also directed opposite to each other. Thus, due to the pair of driving forces F16 directed opposite to each other, the reflector 132 is rotated around the second rotary axis 13b defined by the second supporting parts 137. An amount of rotation at this time is adjusted by controlling magnitude of the magnetic force generated by the second magnetic actuator 139 by a not-shown control unit. Further, a rotation direction is controlled by a direction of the magnetic field F15 generated by the second magnetic actuator 139.

In the optical scanner 1 shown in FIG. 1, by reflecting the emitted light L11 with rotating the reflector 132 around the two axes as described above in the reflector with actuator 13, it is possible to two-dimensionally scan the scanning target region.

Next, a second example will be described. In this second example, a reflector with actuator is different from the one in the above-mentioned first example. On the other hand, a configuration of an optical scanner other than the reflector with actuator is the same as the optical scanner 1 in the first example shown in FIG. 1. In the following, the second example is described focusing on the reflector with actuator which is a difference from the first example, and an explanation of a constitution of the optical scanner which is the same in both examples is omitted.

Figure 5:
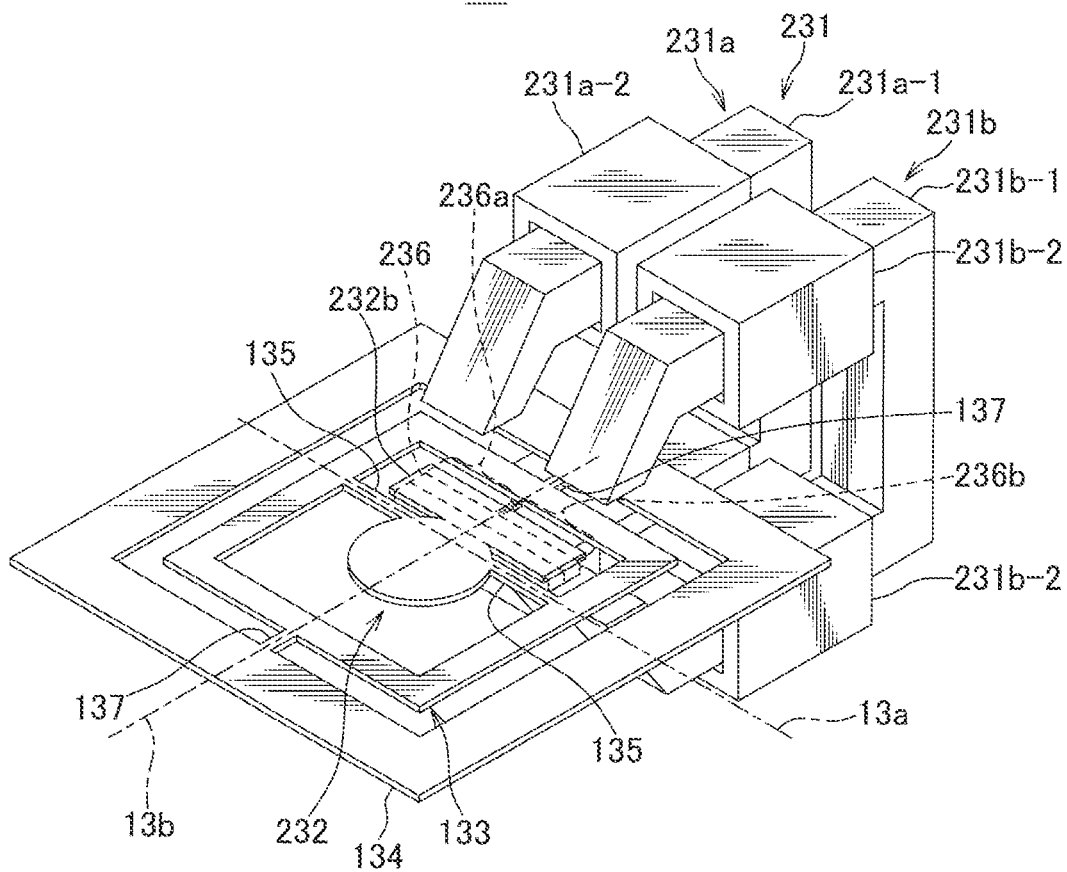
FIG. 5 is a perspective view illustrating a reflector with actuator according to a second example.

FIG. 5 is a perspective view illustrating the reflector with actuator in the second example. In FIG. 5, the same reference signs as FIG. 2 are given to constituent elements which are the same as those of the reflector with actuator 13 in the first example shown in FIG. 2. Overlapping descriptions on those constituent elements which are the same are omitted below.

A reflector with actuator 23 in this example includes only one magnetic element 236. The magnetic element 236 is a permanent magnet extending in an axis direction of the first rotary axis 13a so as to intersect the second rotary axis 13b.

In this example, a magnetic actuator 231 configured to move the magnetic element 236 includes a pair of actuator portions 231a and 231b as described below. The pair of actuator portions 231a and 231b are electromagnets which apply magnetic forces to two portions 236a and 236b of the magnetic element 236 sandwiching the second rotary axis 13b defined by the second supporting part 137. Each actuator portion 231a, 231b includes a yoke 231a-1, 231b-1 and a coil 231a-2, 231b-2. The pair of actuator portions 231a and 231b are arranged to align in a lengthwise direction of the magnetic element 236 so as to sandwich the second rotary axis 13b between each other.

Figure 6:
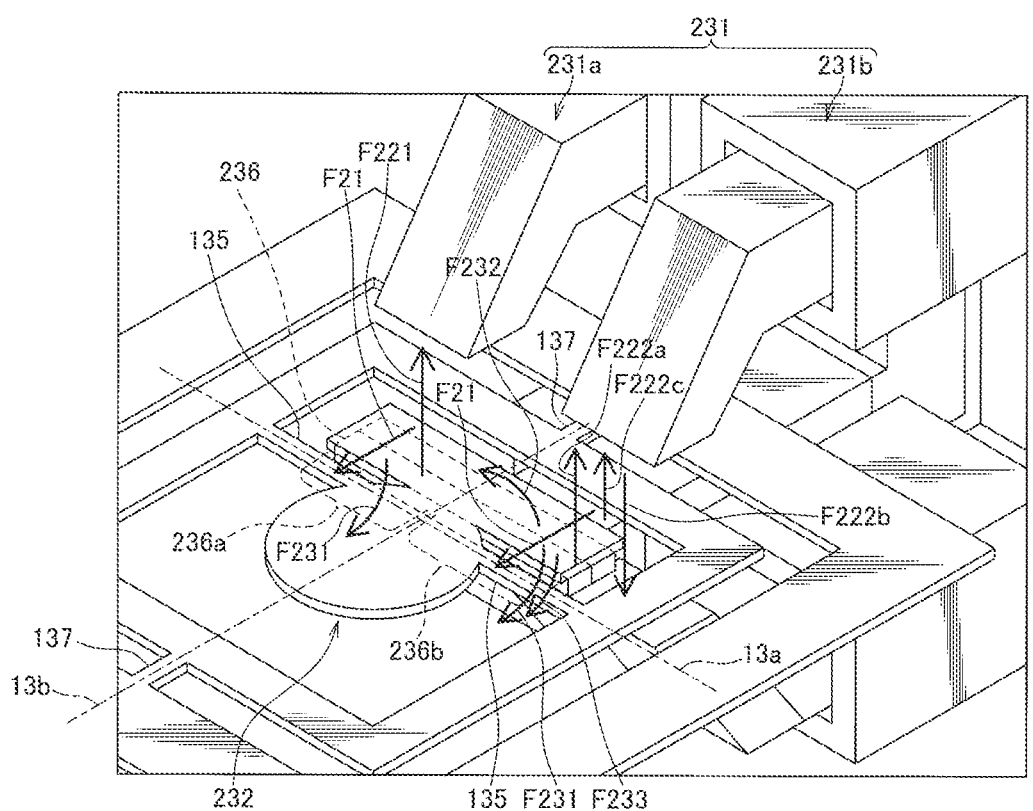
FIG. 6 is an enlarged perspective view of a main portion around the reflector illustrating how the reflector is rotationally driven by a pair of actuator portions shown in FIG. 5.

FIG. 6 is an enlarged perspective view of a main portion around the reflector illustrating how the reflector is rotationally driven by the pair of actuator portions shown in FIG. 5.

First, rotary drive of the reflector 232 around the first rotary axis 13a defined by the first supporting part 135 is explained. This rotary drive is performed when the pair of actuator portions 231a and 231b generate magnetic forces having the same magnitude and the same polarity as each other. In this case, the equivalent driving forces F231 are generated in the respective portions 236a and 236b due to repulsion and attraction between a magnetic field F21 of each of the two portions 236a and 236b of the magnetic element 236 and a magnetic field F221, F222a of each actuator portion 231a, 231b. The reflector 232 rotates around the first rotary axis 13a due to these driving forces F231. A rotation amount at this time is adjusted by controlling magnitude of the magnetic force generated by each of the actuator portions 231a and 231b by a not-shown control unit. Further, a rotation direction is controlled by a direction of these magnetic fields F221 and F222a.

Next, the rotary drive of the reflector 232 around the second rotary axis 13b defined by the second supporting part 137 is explained. This rotary drive is performed when the pair of actuator portions 231a and 231b generate magnetic fields F221 and F222b in directions different from each other.

When the magnetic fields F221 and F222b in directions different from each other are generated, driving forces F231 and F232 in directions opposite to each other are generated with respect to the two portions 236a and 236b of the magnetic element 236. The reflector 232 rotates around the second rotary axis 13b due to the driving forces F231 and F232. A rotation direction in this case is controlled by directions of the magnetic fields F221 and F222b which are different from each other, and a rotation amount is controlled by magnitude of the magnetic force thereof. Therefore, it is possible to make the reflector 232 swing around the second rotary axis 13b by alternately and continuously switching the directions of the magnetic fields F221 and F222b in directions different from each other.

Further, when the magnetic fields F221 and F222c which have the same direction and different intensities are generated, driving forces F231 and F233 having the same direction but different in magnitudes are generated in the two portions 236a and 236b of the magnetic element 236. When these driving forces F231 and F233 are generated, the reflector 132 rotates around the second rotary axis 13b while rotating around the first rotary axis 13a. A rotation amount and a rotation direction in this case am controlled by directions and intensities of the magnetic fields F221 and F222c.

Figure 7:
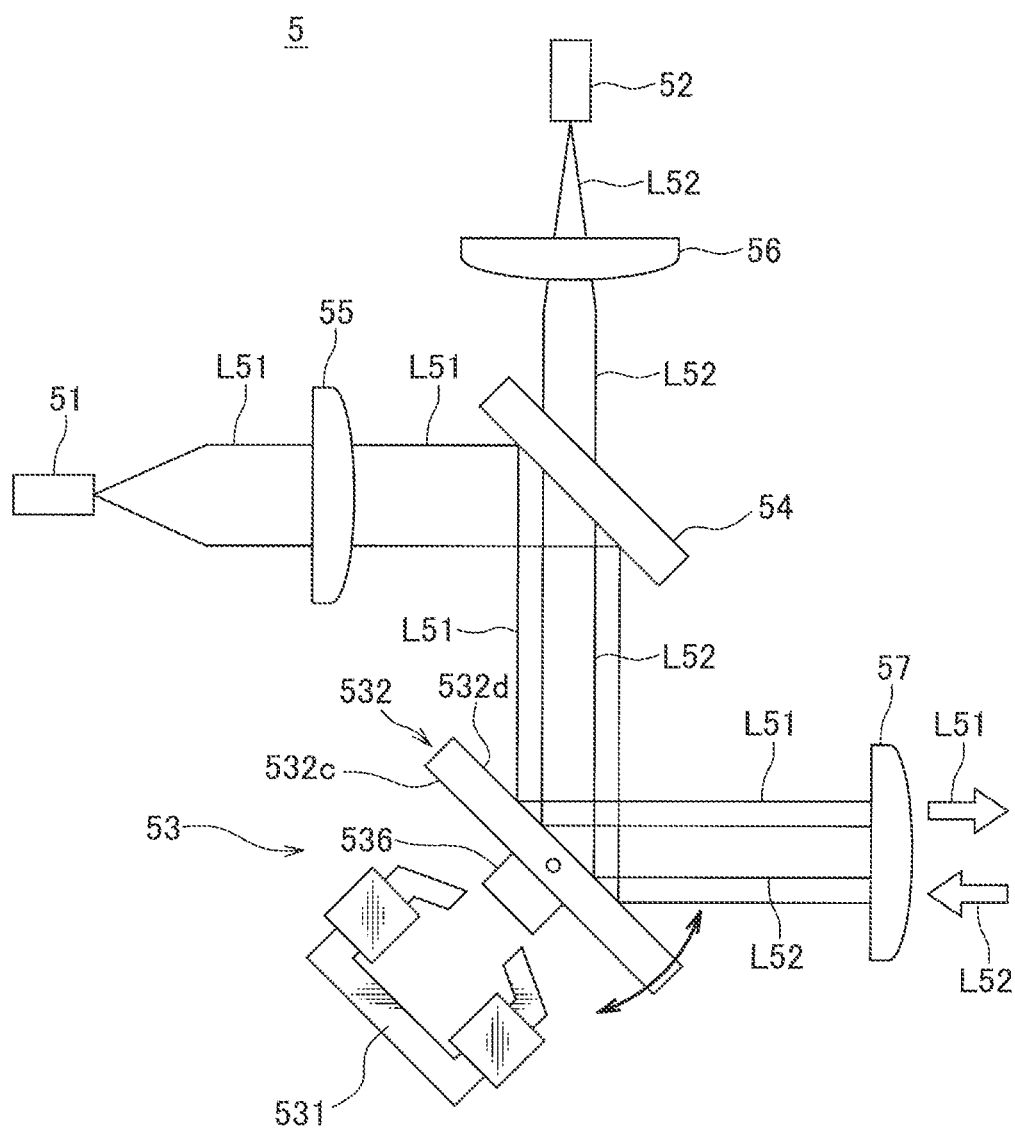
FIG. 7 is a diagram illustrating a comparative example to compare with the first example or the second example shown in FIGS. 1 to 6.

FIG. 7 is a diagram illustrating a comparative example to compare with the first example and the second example shown in FIGS. 1 to 6. In the FIG. 7, the comparative example is shown by an optical scanner 5.

The optical scanner 5 of the comparative example includes a light source 51, an optical detector 52, a reflector with actuator 53, a beam splitter 54, a lens for light source 55, a lens for detector 56, and a shared lens 57. The optical scanner 5 is a device which scans the scanning target region with the emitted light L51 from the light source 51 and measures a distance or the like to an object existing in the scanning target region based on a time taken to detect return light L52 from the scanning target region by the optical detector 52.

In this optical scanner 5, the emitted light L51 from the light source 51 passes through the lens for light source 55, passes through the beam splitter 54, is reflected by the reflector with actuator 53, and emitted to the scanning target region. The reflector with actuator 53 performs a scan by changing a reflection direction of the emitted light L51 from the light source 51 by rotating a reflector 532 by a magnetic actuator 531. A magnetic element 536 which receives a magnetic force from the magnetic actuator 531 is arranged on a rear surface 532c of the reflector 532. The reflector with actuator 53 is a single-sided reflector having a reflection region formed on a surface 532d of the reflector 532 on the opposite of the magnetic element 536.

The return light L52 from the scanning target region is passed through the lens 57, is reflected by the reflector with actuator 53, is passed through the beam splitter 54 and the lens for detector 56, and is directed to the optical detector 12. Then, in a not-shown control device, a distance or the like to an object existing in the scanning target region is calculated based on a time from when the emitted light 51 is emitted from the light source 51 to when the return light L52 is detected by the optical detector 52.

Here, in the optical scanner 5 of the comparative example shown in FIG. 7, as a result of arranging the beam splitter 54, utilization efficiency of light tends to be low since there is loss in amount of light in both of the emitted light L51 and the return light L52.

In contrast, in the above-mentioned first example, the first magnetic element 136 configured to be moved by the first magnetic actuator 131 is installed at a position on the reflector 132 displaced from the first rotary axis 13a. Further, in the above-mentioned second example, the magnetic element 236 configured to be moved by the magnetic actuator 231 is installed at a position on the reflector displaced from the first rotary axis 13a. Thus, in both examples, light can be reflected by the reflection regions on both surfaces of the reflector 132 without being interrupted by the first magnetic element 136 and the first magnetic actuator 131, or the magnetic element 236 and the magnetic actuator 231. That is, the reflectors with actuator 13 and the reflector with actuator 23 of the first example and the second example can be used as a double-sided reflector by widely using both front and rear surfaces thereof. Consequently, as shown in FIG. 1, when configuring the optical deflector 1 with the reflector with actuator 13, 23, it is possible to configure such that the emitted light L11 is reflected by the first surface 132c out of the both surfaces and the return light L12 is reflected by the second surface 132d. As a result, in the optical scanner 1, the return light L12 can be guided to the optical detector 52 without using a beam splitter. That is, according to the reflector with actuator 13 and the reflector with actuator 23 of the first example and the second example, it is possible to constitute the optical scanner 1 having high utilization efficiency of light by not using a beam splitter. Further, according to both of the first example and the second example, since the emitted light L11 and the return light L12 can be passed though difference paths from each other in the optical scanner 1, it is also possible to prevent stray light from one light to the other or an interference with each other. Moreover, it is possible to perform the most appropriate optical path design to the emitted light L11 and the return light L12 individually in the optical scanner 1. The most appropriate optical path design may include for example, optimization of a reflective film configuration on the reflector 132, 232 and/or optimization of an antireflective film configuration in a lens arranged in each optical path.

Here, in both of the first example and the second example, the first magnetic element 136 and the magnetic element 236 are installed in a region as described below out of the two regions of the reflection regions 132a-1 and 132a-2 divided by the first rotary axis 13a. That is, the first magnetic element 136 and the magnetic element 236 are installed in the region having a shorter length in the orthogonal direction D11.

Consequently, with respect to the region out of the two regions having the longer length, it is possible to obtain a large rotation amount around the first rotary axis 13a with respect to the driving amount of the first magnetic element 136 or the magnetic element 236. In the optical scanner 1, since the emitted light L11 and the return light L12 are reflected by this region having the longer length while avoiding the first magnetic element 136 or the magnetic element 236, it is possible to obtain a large scanning amount with respect to the driving amount of the first magnetic element 136 or the magnetic element 236.

Further, since the first magnetic element 136 and the magnetic element 236 are installed in a region which is not a reflection region (a position displaced from the reflection region), a defect such as generation of deformation in the reflection region hardly occurs.

Further, the above-mentioned reflector with actuator 13 of the first example includes the second magnetic element 138 and the second magnetic actuators 139 in addition to the first magnetic element 136 and the first magnetic actuator 131.

Thus, in the reflector with actuator 13 of the first example, the reflector 132 can be rotated around the two axes of the first rotary axis 13a and the second rotary axis 13b.

That is, it is possible to constitute the optical scanner capable of two-dimensionally scanning the scanning target region. Further, since rotation of the reflector 132 around the respective rotary axes 13a and 13b is performed by the magnetic elements and the magnetic actuators corresponding to the respective rotary axes 13a and 13b, rotation of the reflector 13 around the rotary axes 13a and 13b can be easily performed.

Further, in the above-mentioned reflector with actuator 23 of the second example, the magnetic actuator 231 includes the pair of actuator portions 231a and 231b as described below. The pair of actuator portions 231a and 231b applies magnetic forces to the two portions 236a and 236b of the magnetic element 236 that are arranged so as to sandwich the second rotary axis 13b.

This can also allow the reflector 232 to rotate around the two axes, namely, the first rotary axis 13a and the second rotary axis 13b, thus it is possible to constitute the optical scanner 1 capable of two-dimensionally scanning the scanning target region. Further, since the reflector 232 can be rotated about the two axes using only the combination of the magnetic element 236 and the magnetic actuator 231, it is possible to downsize the reflector with actuator 23.

Further, in the reflector with actuator 23 of the second example, the rotation of the reflector 232 around the first rotary axis 13a can be controlled by controlling a direction and an intensity of the magnetic forces generated by the pair of actuator portions 231a and 231b while balancing them. In addition, the rotation of the reflector 232 around the second rotary axis 13b can be controlled by controlling directions and intensities of the magnetic forces generated by the respective ones of the pair of actuator portions 231a and 231b differently from each other.

The present invention is not limited to the examples explained above. The present invention may include other configurations which can achieve the object of the present invention, and the following modifications are also included in the present invention.

For example, in the above-mentioned first example and the second example, the reflectors with actuator 13 and 23 which rotate the reflectors 132 and 232 around the two axes are exemplified as an example of the reflector with actuator according to the present invention. However, the reflector with actuator according to the present invention is not limited to this, and for example, it may include only one set of a magnetic element and a magnetic actuator to rotates the reflector around a single axis.

Further, in the above-mentioned first example and the second example, the first magnetic element 136 and the magnetic element 236 which are permanent magnets are exemplified as an example of the first magnetic element according to the present invention.

Similarly, the second magnetic element 138 which is a permanent magnet is exemplified as an example of the second magnetic element according to the present invention. However, the first magnetic element and the second magnetic element according to the present invention are not limited to these, and may be, for example, a coil in which a driving force is generated when it is applied with an electric current and then applied with a magnetic force. In this case, the magnetic actuator which moves the coil may be a permanent magnet.

Further, in the above-mentioned first example and the second example, the reflectors 132 and 232 which include the circular plate portion 132a having a reflection region on both surfaces thereof and the rectangular plate portions 132b and 232b are exemplified as examples of the reflector according to the present invention. However, the reflector according to the present invention is not limited to these. The reflector according to the present invention may have any shape including a simple circular plate shape or rectangular shape, as long as the reflection regions are formed on the both surfaces thereof.

Further, in the present examples, it was explained that one magnetic element 136, 236 is installed on one surface of the reflector 132, 232; however, magnetic elements divided into two may also be used, and/or the magnetic element(s) may be installed on the both surfaces. Alternatively, an opening may be provided at a magnet installation position on the reflector 132, 232, and one magnetic element 136, 236 may be fitted into the opening. In this case, the magnetic element 136, 236 appears on both surfaces of the reflector 132, 232. In a case where the magnetic element is installed on the both surfaces or fitted into the opening, it is possible to keep a balanced state with respect to the rotary axis of the reflector even when the reflector 132, 232 are installed vertically, thereby preventing the reflector from being rotated and inclined to one side when, for example, the reflector is not driven.

Further, in the present examples, the magnetic element 136, 236, 135 has a shape of a rectangle having the lengthwise direction; however, the present invention it is not limited to this. As long as enough power to rotationally drive the reflector 132 or 232 can be obtained, size of the magnetic element may be small, and for example, a magnetic element formed in a square shape may also be used.

REFERENCE SIGNS LIST 1 optical scanner
11 light source
12 optical detector
13, 23 reflector with actuator (mirror actuator)
13a first rotary axis
13b second rotary axis
14 reflection mirror for emitted light
15 lens for light source
16 lens for detector
17 lens for emitted light
18 lens for return light
131 first magnetic actuator
131a. 139a, 231a-1, 231b-1 yoke
131b, 139b, 231a-2, 231b-2 coil
132, 232 reflector (swing part)
132a circular plate portion
132a-1, 132a-2 reflection region
132b, 232b rectangular plate portion
132c first surface
132d second surface
133 inner frame
133a side portion
134 outer frame
135 first supporting part
136 first magnetic element
137 second supporting part
138 second magnetic element
139 second magnetic actuator
231 magnetic actuator (first magnetic actuator)
231a, 231b actuator portion
236 magnetic element (first magnetic element)
236a, 236b portion
D11 orthogonal direction
F11, F12, F14, F15, F21, F221, F222a, F222b, F222c magnetic field
F13, F16, F231, F232, F233 driving force
L11 emitted light
L12 return light

The invention claimed is:

1. A reflector with actuator comprising:
a reflector having reflection regions formed on both surfaces thereof;
a first supporting part supporting the reflector and defining a first rotary axis of the reflector;
a first magnetic element installed on the reflector at a position displaced from the first rotary axis; and
a first magnetic actuator configured to act on the first magnetic element to move the first magnetic element in a direction that rotates the reflector around the first rotary axis,
wherein the first magnetic element has a dimension in a longitudinal direction which is larger than a dimension of the first magnetic element in a transverse direction orthogonal to the longitudinal direction, and wherein the longitudinal direction of the first magnetic element extends in parallel to the first rotary axis.

2. The reflector with actuator according to claim 1, wherein the first magnetic element is installed on at least one surface of the reflector.

3. The reflector with actuator according to claim 1, wherein the first rotary axis divides the reflection region into two regions having different lengths in a direction orthogonal to the first rotary axis, and
wherein the first magnetic element is installed in a region having the length that is shorter.

4. The reflector with actuator according to claim 1, further comprising:
a second supporting part supporting the reflector so as to define a second rotary axis orthogonal to the first rotary axis;
a second magnetic element installed at a position at which the second magnetic element is moved, when applied with a magnetic force, in a direction that rotates the reflector around the second rotary axis; and
a second magnetic actuator configured to apply the magnetic force with respect to the second magnetic element.

5. The reflector with actuator according to claim 1, further comprising a second supporting part supporting the reflector so as to define a second rotary axis orthogonal to the first rotary axis,
wherein the first magnetic element is an element extending in an axis direction of the first rotary axis so as to intersect the second rotary axis, and
wherein the first magnetic actuator comprises a pair of actuator portions configured to apply magnetic forces to two portions of the first magnetic element that are arranged so as to sandwich the second rotary axis.

6. The reflector with actuator according to claim 5, wherein the pair of actuator portions moves the first magnetic element in a direction that rotates the reflector around the second rotary axis by applying the magnetic forces that are different from each other in at least one of magnitude and polarity.

7. An optical scanner comprising:
a light source;
an optical detector; and
the reflector with actuator according to claim 1,
wherein the optical scanner is configured such that emitted light from the light source is reflected by a first surface out of both surfaces of the reflector of the reflector with actuator so as to be guided to a scanning target region, and return light from the scanning target region is reflected by a second surface out of the both surfaces so as to be guided to the optical detector.

8. The reflector with actuator according to claim 1, wherein the first magnetic element has a rectangular parallelepiped shape.

9. A mirror actuator comprising:
a swing part having a first surface and a second surface arranged on an opposite side of the first surface, the first surface and the second surface corresponding to reflection surfaces;
a first supporting part supporting the swing part so as to allow the swing part to swing around a first swing axis;
a magnet provided in a region of the swing part where the reflection is not formed; and
a yoke that generates a magnetic field acting on the magnet,
wherein the magnet has a dimension in a longitudinal direction which is larger than a dimension of the magnet in a transverse direction orthogonal to the longitudinal direction, and wherein the longitudinal direction of the magnet extends in parallel to the first swing axis.

10. The mirror actuator according to claim 9,
wherein the magnet is provided on at least one of the first surface and the second surface of the swing part.

11. The mirror actuator according to claim 9, wherein the magnet has a rectangular parallelepiped shape.

* * * * *